United States Patent
Heyne et al.

(10) Patent No.: US 9,303,753 B2
(45) Date of Patent: Apr. 5, 2016

(54) DEVICE FOR VENTILATING TRANSMISSIONS

(71) Applicant: Siemens Aktiengesellschaft, München (DE)

(72) Inventors: Stefan Heyne, Frohburg (DE); Uwe Krämer, Penig (DE); Thomas Steubler, Lugau/Erzgebirge (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/195,213

(22) Filed: Mar. 3, 2014

(65) Prior Publication Data

US 2014/0326104 A1 Nov. 6, 2014

(30) Foreign Application Priority Data

Mar. 4, 2013 (DE) .......................... 10 2013 203 612

(51) Int. Cl.
*F16H 57/04* (2010.01)
*F16H 57/027* (2012.01)

(52) U.S. Cl.
CPC .......... *F16H 57/027* (2013.01); *F16H 57/0454* (2013.01); *Y10T 74/2189* (2015.01)

(58) Field of Classification Search
USPC ............... 74/606 A, 606 R; 184/6.12; 454/69
See application file for complete search history.

(56) References Cited

U.S. PATENT DOCUMENTS

| 5,293,788 A | 3/1994 | Blom |
| 5,724,864 A * | 3/1998 | Rodgers et al. ............. 74/606 R |
| 6,058,969 A * | 5/2000 | Bollwahn et al. ............. 137/583 |
| 7,370,729 B2 * | 5/2008 | Okuno et al. ................ 184/6.23 |
| 2004/0173051 A1 | 9/2004 | Bennett |
| 2007/0209876 A1 | 9/2007 | Sato |
| 2008/0156374 A1 | 7/2008 | Morise |

FOREIGN PATENT DOCUMENTS

| CN | 202056283 U | 11/2011 |
| CN | 202327017 U | 7/2012 |
| DE | 254235 A1 | 2/1988 |
| DE | 4136392 A1 | 5/1992 |
| DE | 102011085377 B3 | 1/2013 |
| JP | 2001065670 A | 3/2001 |
| JP | 2009293749 A | 12/2009 |
| KR | 1020110027978 A | 3/2011 |

* cited by examiner

*Primary Examiner* — Vicky Johnson
(74) *Attorney, Agent, or Firm* — Henry M. Feiereisen LLC

(57) ABSTRACT

A device for ventilating a transmission includes a first component configured for fixed arrangement on the transmission and a second component configured for movable arrangement on an outer side of a transmission housing of the transmission. The first and second components are connected to one another by a joint which permits a movement of the first and second components relative to one another. A pipeline extends along the first and second components and has first and second ends for an air exchange, with the first end of the pipeline arranged on the first component and with the second end of the pipeline arranged on the second component. The second component has a center of gravity which is located opposite to the second end of the pipeline in relation to a connecting point between the joint and the second component.

24 Claims, 6 Drawing Sheets

DEVICE FOR VENTILATING TRANSMISSIONS

CROSS-REFERENCES TO RELATED APPLICATIONS

This application claims the priority of German Patent Application, Serial No. 10 2013 203 612.4, filed Mar. 4, 2013, pursuant to 35 U.S.C. 119(a)-(d), the disclosure of which is incorporated herein by reference in its entirety as if fully set forth herein.

BACKGROUND OF THE INVENTION

The present invention relates to a device for ventilating transmissions and to a transmission having such a device.

The following discussion of related art is provided to assist the reader in understanding the advantages of the invention, and is not to be construed as an admission that this related art is prior art to this invention.

Heat losses from a transmission result in temperature fluctuations in the transmission housing. The internal pressure in the transmission housing changes as a result of the fluctuations in temperature. These pressure differences between the housing interior and the environment of the housing are to be balanced out.

In the case of transmissions, in which the orientation of the lubricant level relative to the transmission axes remains unchanged during operation of the transmission, ventilation can be achieved by using a ventilation valve, which is arranged at a point on the transmission housing which lies above the lubricant level. When pivoting transmissions or transmissions that rotate about 360 degrees are involved, the use of such a valve is not possible, since, on account of the change in position of the transmission, the valve would drop to below the lubricant level and lubricant would thus escape from the transmission housing.

It would therefore be desirable and advantageous to address this problem and to obviate other prior art shortcomings.

SUMMARY OF THE INVENTION

According to one aspect of the present invention, a device for ventilating a transmission includes a first component configured for fixed arrangement on the transmission, a second component configured for movable arrangement on an outer side of a transmission housing of the transmission, a joint configured to connect the first and second components and to permit a movement of the first and second components relative to one another, and a pipeline extending along the first and second components and having first and second ends for an air exchange, with the first end of the pipeline arranged on the first component and with the second end of the pipeline arranged on the second component, wherein the second component has a center of gravity which is located opposite to the second end of the pipeline in relation to a connecting point between the joint and the second component.

In order to ensure clarity, the term "pipeline" relates in the description to both a flexible hose line, e.g. a plastic or rubber hose, and a rigid pipe, e.g. a metal or plastic pipe.

The present invention resolves prior art shortcomings by recognizing that the force of gravity can be used to ensure that one end of a pipeline for ventilation is positioned at any time vertically above a lubricant level. To this end, it is necessary for a component of the device, in which the end of the pipeline having a ventilation opening is arranged, to be able to be moved irrespective of the transmission and for the center of gravity of this component to lie opposite the end of the pipeline having the ventilation opening with respect to the point of rotation of the component. As the component of the ventilation device thus automatically assumes an upright position on the outer side of the transmission housing, the end of the component having the ventilation opening is always positioned above the current oil level so that no oil can escape from the transmission and no overpressure can develop in the transmission interior.

The invention is used to ventilate transmissions in a safe and simple manner with a very high fluctuation range and/or transmissions rotating together, such as are used for instance in stranding machines, based on a cost-effective mechanical solution. The invention expands the area of application of transmission motors, e.g. in handling applications, in jig manufacturing, in fairground rides, etc.

The arrangement of the second component which can be moved, in particular rotated, relative to the transmission, on the outer side of the transmission housing ensures a large freedom of movement of the second component. As the second component is arranged outside of the transmission, no space needs to be provided inside the transmission for the movement of the second component. The transmission can therefore be constructed compactly. Since the second component and the joint which connects the first and the second components to one another, are arranged outside of the transmission, unwanted influence by lubricant, e.g. unwanted application of lubricant on the exterior of the second component or joint, is ruled out.

The movable section of the ventilation device is therefore arranged outside of the transmission housing. The advantage is that oil is prevented from interfering with a rotation of the movable section of the ventilation device.

According to another advantageous feature of the present invention, the pipeline can be configured to extend through the first and second components and/or the joint. The advantage here is that the pipeline runs inside the device in a protected manner.

According to another advantageous feature of the present invention, an expansion tank, such as a pressure expansion tank, can be provided. In the event of overpressure in the transmission interior, oil can thus flow out of the transmission interior and into the expansion tank. In this way, pressure inside the transmission can be equalized with respect to the ambient pressure. Advantageously, the second component includes this expansion tank, e.g. the expansion tank is integrated into the second component. The advantage here is that oil can initially escape from the interior of the transmission, without being released immediately into the environment of the transmission.

According to another advantageous feature of the present invention, the second component can have a receiving apparatus configured to accept a weight element for defining the center of gravity. The receiving apparatus may be a bolt, to which a weight element is screwed. The advantage here is that the position of the center of gravity and the weight force can be adjusted to an optimum depending on the fluctuation range and frequency of the transmission by suitably selecting the weight element.

According to another advantageous feature of the present invention, the axial length of the second component is selected large enough for the opening of the pipeline facing away from the transmission to exceed an oil level in the transmission in each possible position of the transmission. The rotatable section of the ventilation device is therefore advantageously long enough for the end of the pipeline relative to the ventilation to always be positioned vertically above the oil level. There is more space outside of the transmission housing than inside the transmission. The arrangement of the second component outside of the transmission therefore allows the movable part of the ventilator to be selected long enough for the upper ventilation opening to always be above the oil level, even during complicated rotations of the transmission.

According to another advantageous feature of the present invention, the first component has a fastening apparatus configured to mount the first component on an outer side of the transmission housing. For example, the first component can be screwed on a flange of the transmission housing.

According to another advantageous feature of the present invention, the joint can be configured as a ball or rotary joint. Advantageously, the joint is configured as an axial rotary feedthrough.

According to another advantageous feature of the present invention, a ventilator cap can be arranged on the second end of the pipeline, e.g. with a cover cap. The ventilator has a ventilation opening for allowing air to flow through in both directions, so that air can flow out of the interior of the transmission and into the interior of the transmission. A cover flap or a non-vertical alignment of the opening largely prevents unwanted materials, which would contaminate the interior of the transmission, e.g. dust or rainwater, from entering into the pipeline.

According to another advantageous feature of the present invention, a non-return valve can be disposed in the pipeline to seal the pipeline against a passage of lubricant, e.g. a transmission oil, in a direction of the second end of the pipeline. To this end, the non-return valve can be embodied as a non-return flap or a ball valve, which, on account of the flow of lubricant, which flows out of the transmission interior in the direction of the second end of the pipeline, close the pipeline. A passage of lubricant up to the second end of the pipeline and to the ventilation opening is thus prevented. The non-return valve is thus used as a safety valve, which allows for pressure equalization between the transmission interior and the environment by way of the pipeline, but prevents the escape of lubricant from the transmission into the environment.

With the aid of the non-return valve, an unwanted increase in the lubricant level in the pipeline up to the ventilation opening, as can occur with an unfavorable rotational behavior of the transmission, in which the vertical alignment of the second component caused by the gravity only occurs after a delay, can be prevented, at least long enough for the second component to swing back into a vertical alignment. Even with an unexpectedly high rotational speed of a transmission, in which the centrifugal force on the center of gravity is greater than the gravitational force and thus no vertical alignment of the second component occurs, an unwanted increase in the lubricant level in the pipeline up to the ventilation opening can be prevented by means of the non-return valve.

It is also possible, with the aid of the non-return valve, to embody the second component of the device to be shorter than would actually be necessary, if, in each position of the transmission, a position of the ventilation opening arranged at the second end of the pipeline vertically above the lubricant level is intended to be ensured. The non-return valve also ensures, in the case of a shortened, second component, that a position of the ventilation opening arranged on the second end of the pipeline vertically below the lubricant level does not lead to an escape of lubricant from the ventilation opening, because the pipeline is sealed off from a passage of lubricant through the non-return valve. If the ventilation device is embodied such that a "critical" position of this type of the ventilation opening arranged at the second end of the pipeline vertically below the lubricant level only occurs briefly and over the short term (e.g. in the range of 1 s), this can represent an acceptable and sufficiently reliable solution. With a transmission which rotates through 360 degrees, this can allow for a significant shortening of the second component of the device.

According to another aspect of the present invention, a transmission includes a transmission housing having an opening, and a ventilation device having a first component configured for fixed arrangement on the transmission, a second component configured for movable arrangement on an outer side of the transmission housing, a joint configured to connect the first and second components and to permit a movement of the first and second components relative to one another, and a pipeline extending along the first and second components and having first and second ends, with the first end of the pipeline arranged on the first component in communication with an interior of the transmission housing via the opening, and with the second end of the pipeline arranged on the second component and connected to an environment of the transmission housing so as to enable an air exchange between the transmission interior and the environment, wherein the second component has a center of gravity which is located opposite to the second end of the pipeline in relation to a connecting point between the joint and the second component.

The transmission may be an industrial transmission or an application transmission of any type, e.g. planetary transmission, spur gear or worm gear units.

According to another advantageous feature of the present invention, the second end of the pipeline lies vertically above a lubricant level in the interior of the transmission housing, irrespective of a position of the transmission.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
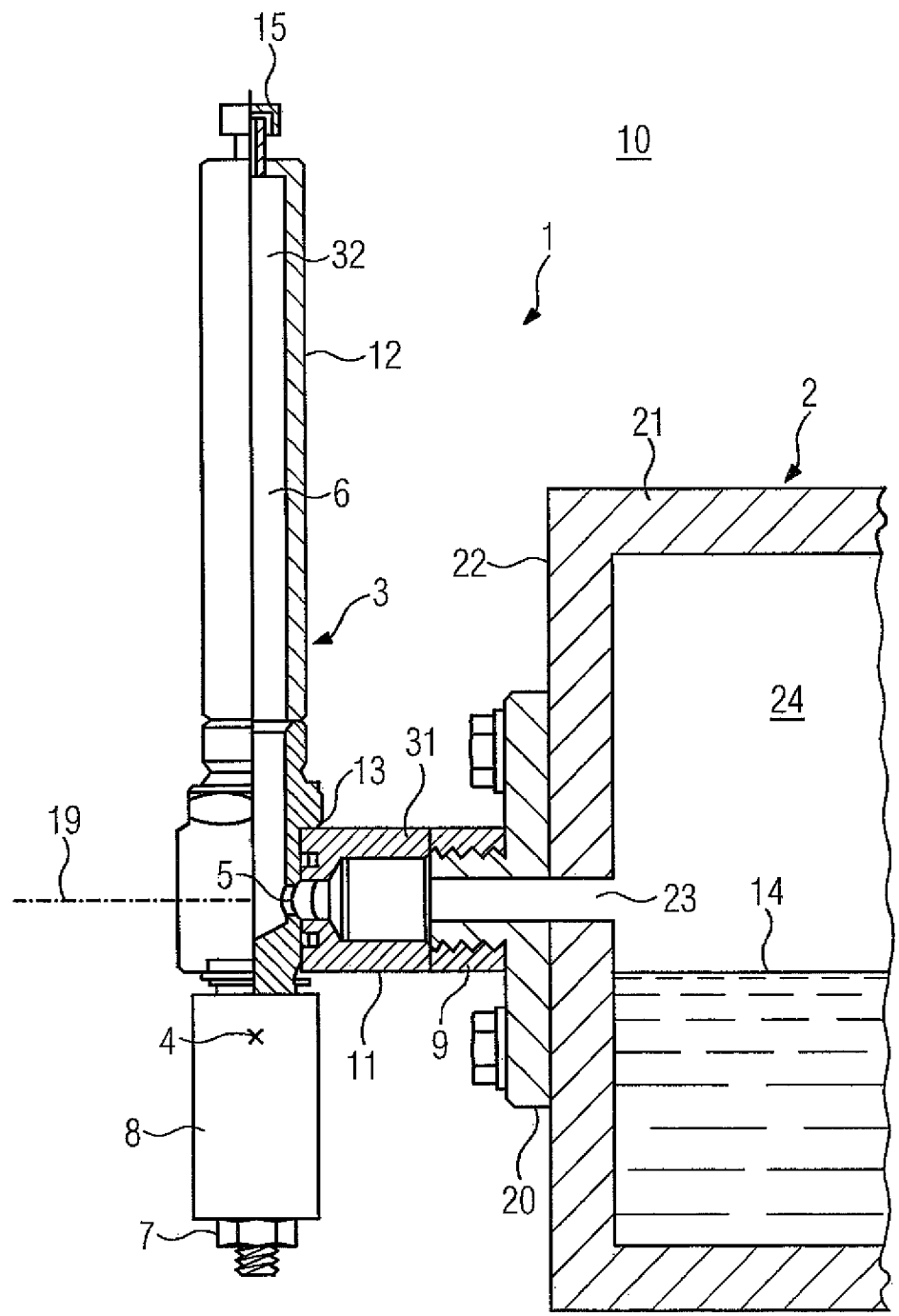
FIG. 1 is a half-sectional view of a first exemplary embodiment of a ventilation device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a half-sectional view of a first exemplary embodiment of a ventilation device according to the present invention, generally designated by reference numeral 1, for ventilating a transmission 2 operated with splash lubrication. The device 1 includes a first tubular component 11 and a second tubular component 12, which has a length which substantially exceeds a length of the first component 11. The second component 12 includes a thin-walled pipe with a narrow shape, which is used as an expansion tank. At one end, the second component 12 bears a thick steel disk 8, which is fixed to the expansion tank 6 with a screw apparatus 7.

The first component 11 has an inner thread 9 on its end on the transmission side, which is fixed by a screw connection onto an outer thread of a screw flange 20, which is arranged on an exterior 22 of the transmission 2. Both components 11 and 12 are connected to one another and movable relative to one another by means of a joint 13. The joint 13 is embodied as an axial-rotary feedthrough, e.g. a spherically-mounted rotary feedthrough for instance, i.e. the second component 12 can be rotated about an axis of rotation 19, which coincides with a longitudinal axis of the first component, in relation to the first component 11 and thus also facing the transmission 2 on the exterior 22 of the transmission housing 1.

The device 1 includes a pipeline 3 extending along the first and second components 11, 12 and having a first end 31 and a second end 32. The pipeline 3 is formed by the pipe interiors of the two tubular components 11, 12. The first end 31 is disposed on a transmission-side end of the first component 11. The second end 32 is disposed on an end of the second component 12 which faces away from the transmission 2, which is covered by a conventional ventilation flap 15. The pipeline 3 also passes through the joint 13. At the transition from the first component 11 to the second component 12, in i.e. at the connecting point 5 of the joint 13 and the second component 12, the pipeline 3 has a change in direction of about 90°. Air can be exchanged between the first end 31 of the pipeline 3 and the second end 32 of the pipeline 3 through the pipeline 3.

The second end 32 of the pipeline 3 is connected to the interior 24 of the transmission 2 through an opening 23, which is embodied in the transmission housing 21 of the transmission 2 above a lubricant level 14. A continuous possibility of exchanging air exists in this way between the interior 24 of the transmission 2 and the environment 10 of the transmission 2.

On account of the weight element 8, the center of gravity 4 of the second component 12 with respect to the connecting point 5 of the joint 13 and the second component 12 lies opposite the second pipeline end 32. In the event of a rotation of the transmission 2 about the axis of rotation 19, the force of gravity acting on the weight element 8, which is arranged at an end of the second component 12 facing the second pipeline end 32, causes the second pipeline end 32 to remain vertically there above. The second element 12 initially follows the movement of the transmission 2 on account of its inertia in a tumbling motion. The position of the center of gravity 4 and the sufficiently large weight force of the weight element 8 then ensure that the container 6 is moved into the vertical position in each position of the transmission 2.

On account of the length of the second component 12 and the pipeline 3 running axially in the second component 12, no oil can thus reach the ventilation opening 15, irrespective of the momentary position of the transmission 2. As a result of the spontaneous alignment of the second component 12 to an upright position, the ventilator 15 is always positioned above the momentary oil level 14 so that no oil can escape and no overpressure can develop inside 24 the transmission 2. The alignment of the second component 12 in the vertical is retained irrespective of the position of the transmission 2 and ensures that no lubricant can escape from the transmission 2, but a reliable air exchange still exists between the interior 24 of the transmission 2 and the environment 10 of the transmission 2.

Figure 2:
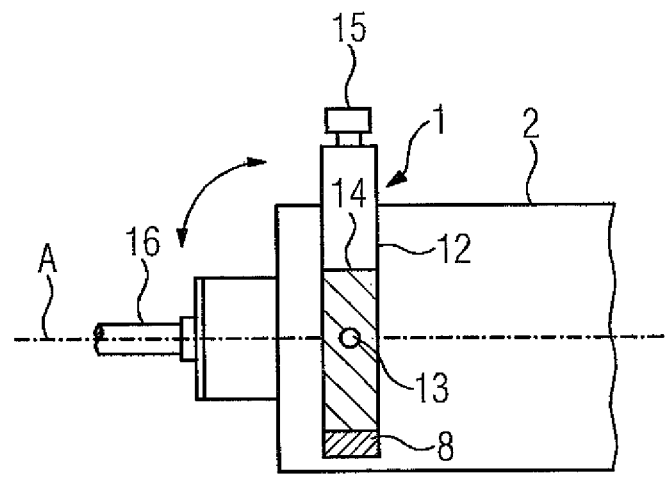
FIG. 2 is a partly sectional view of a second exemplary embodiment of a ventilation device according to the present invention with a horizontal transmission position.

FIG. 2 shows the vertical position of a second component 12 of a ventilation device 1 with an alignment of the axis A of a take-off or drive shaft 16 of a transmission 2 in the horizontal direction. The vertical alignment of the second component 12 is realized by its center of gravity which lies in the vertical direction below a hinge 13, about which the second component 12 is rotatably mounted. This relatively low-lying center of gravity is formed by a weight element 8 at one end of the second component 12, which lies opposite to the ventilation opening 15 attached to the opposite end of the second component 12. The interior of the second component 12 is used as an expansion tank which exchanges fluid with the interior of the transmission 2, in which the transmission oil has the same level as inside the transmission 2.

Figure 3:
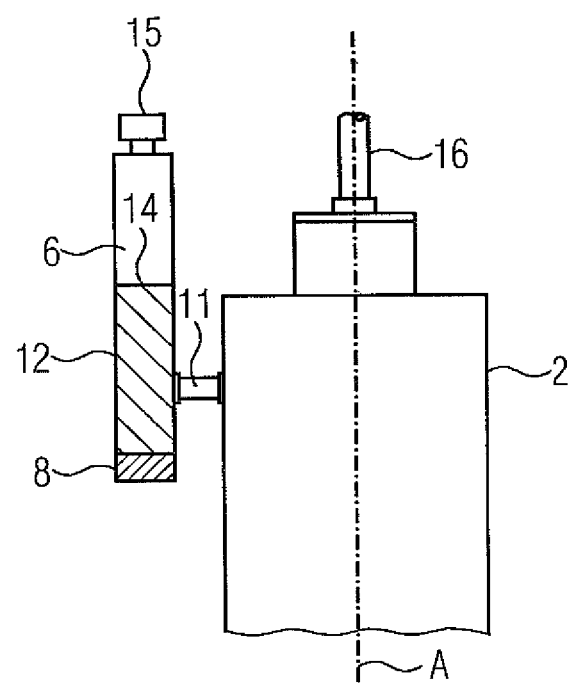
FIG. 3 is a partly sectional view of the ventilation device of FIG. 2 with a vertical transmission position.

FIG. 3 likewise shows the device 1 depicted in FIG. 2, wherein, unlike in FIG. 2, the axes A of the take-off or drive shaft 16 of the transmission 2 are aligned vertically. The second component 12 which can be rotated relative to the first component 11 and the transmission 2 is again aligned vertically, like in FIG. 2.

Figure 4:
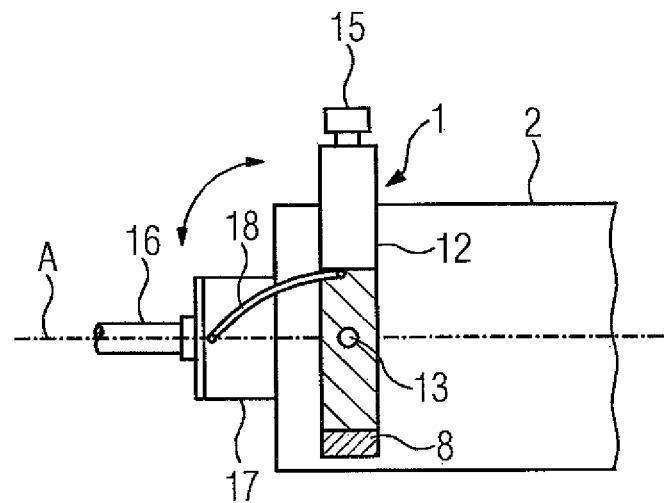
FIG. 4 is a partly sectional view of a third exemplary embodiment of a ventilation device according to the present invention with a horizontal transmission position.
Figure 5:
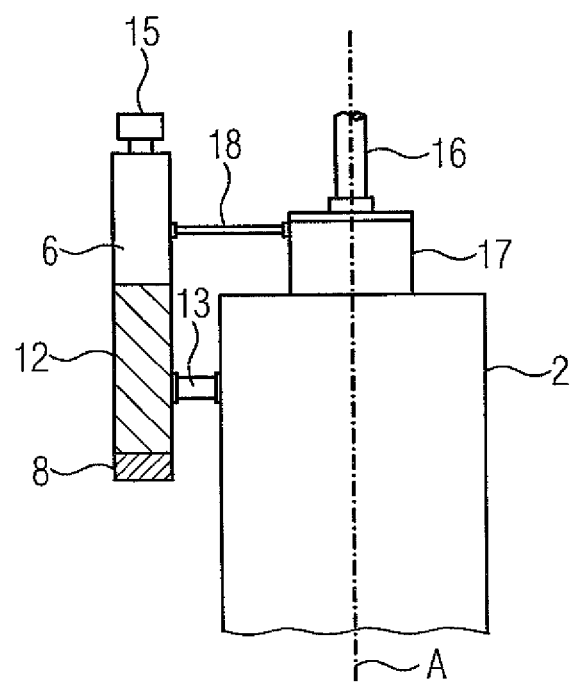
FIG. 5 is a partly sectional view of the ventilation device of FIG. 4 with a vertical transmission position.

The exemplary embodiment shown in FIGS. 4 and 5 largely corresponds to the exemplary embodiment shown in FIGS. 2 and 3, except for the difference that in addition, for ventilating the flange socket 17, a hose 18 with an axial swivel joint is installed. The hose, 18 allows for air and fluid to be exchanged between the flange socket 17 and the second component 12.

In addition, the bearings of the flange socket 17 can be provided with NILOS rings, in order to hamper the return of oil into the transmission 2. NILOS rings, which are made of galvanized steel, can be used in greased roller bearings, in order to prevent the escape of lubricant and the penetration of dust. NILOS rings can be obtained for instance from Ziller GmbH & Co. KG, 40721 Hilden, Germany. The bearings of the intermediate shaft could in addition be encapsulated so that sufficient residual oil is always available. Since no overpressure develops in this variant, no pressure resistant shaft seals are required.

Figure 6:
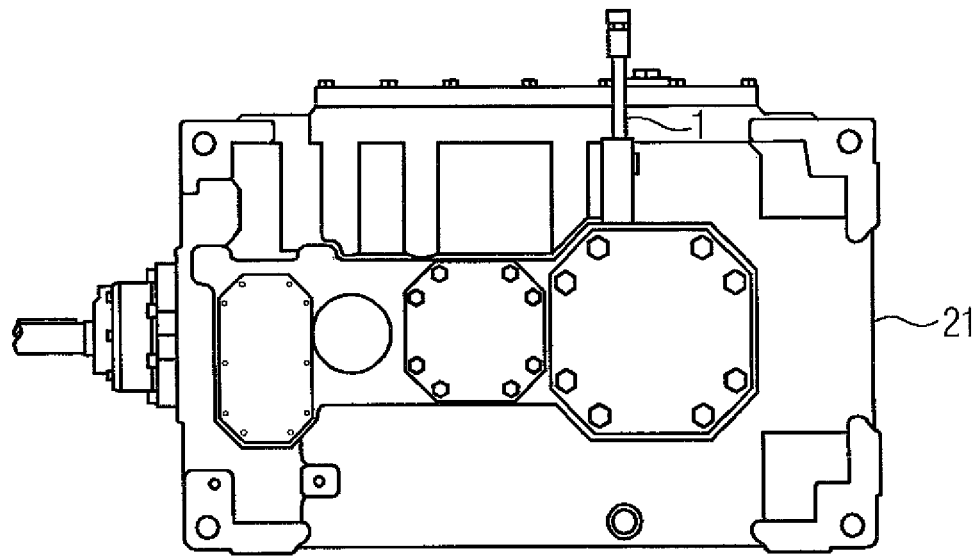
FIG. 6 is a side view of a ventilation device arranged on a transmission housing
Figure 7:
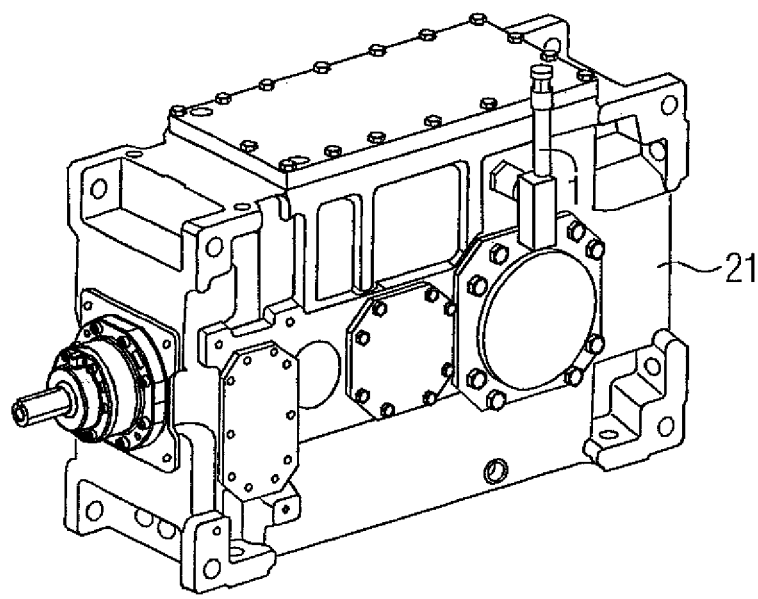
FIG. 7 is an isometric view of the ventilation device of FIG. 6.

FIGS. 6 and 7 show a side view and an isometric view of a ventilation device 1 on a transmission housing 21.

Figure 8:
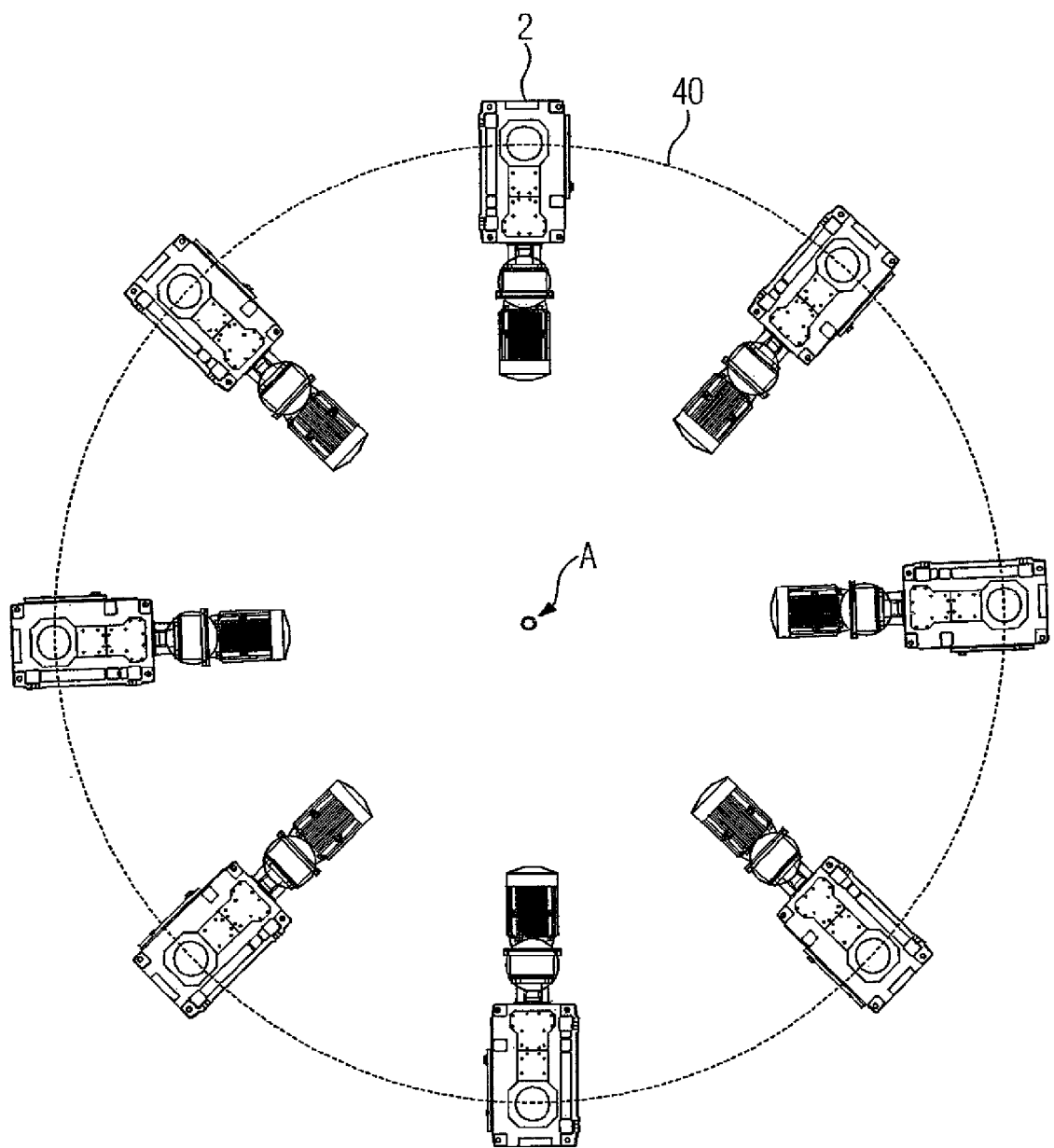
FIG. 8 is a schematic illustration of an application of the ventilation device to a wire stranding system.

FIG. 8 illustrates a possible application of such transmissions 2 to a wire stranding system. Four coil carriers are arranged on a circular path 40 with a diameter of approx. 6 cm about a central axis A offset by 90°. The transmissions 2 are positioned on a coil carrier in each instance. The coil carriers rotate at a rotational speed of approx. 5.5 revolutions per minute about the central axis A. With this process, the transmissions 2 rotate in each instance about 360°.

Figure 9:
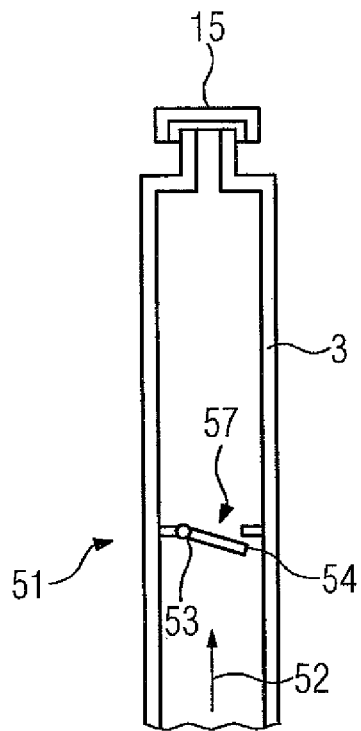
FIG. 9 is a schematic illustration of a first variant of a non-return valve in a pipeline of the ventilation device.
Figure 10:
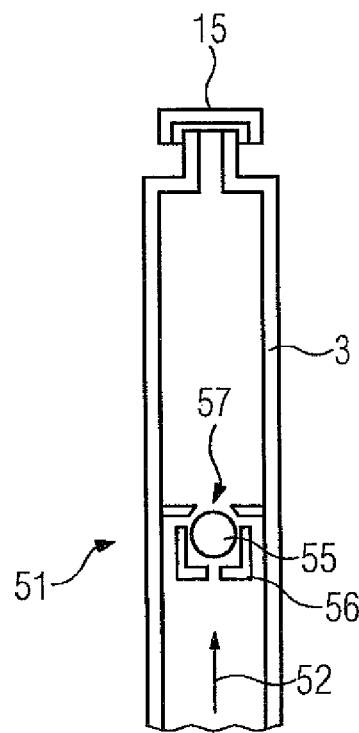
FIG. 10 is a schematic illustration of a second variant of a non-return valve in a pipeline of the ventilation device.

FIGS. 9 and 10 each show a section of a second end of a pipeline 3 with a ventilation opening 15. A non-return valve 51 is used inside the pipeline 3, which is suited to sealing the pipeline 3 against a passage of fluid lubricant flowing in the flow direction 52 to the ventilation opening 15, e.g. a transmission oil. With the exemplary embodiment shown in FIG. 9, the non-return valve 51 is embodied as a flap 54 which is rotatably mounted about a hinge 53, which closes a feedthrough opening 57 under the influence of a flow 52. In the exemplary embodiment shown in FIG. 10, the non-return valve 51 is embodied as a cage 56 with a ball 55 guided therein, which, under the influence of a flow 52, is pushed against a flow opening 57 and thus closes the same.

Figure 11:
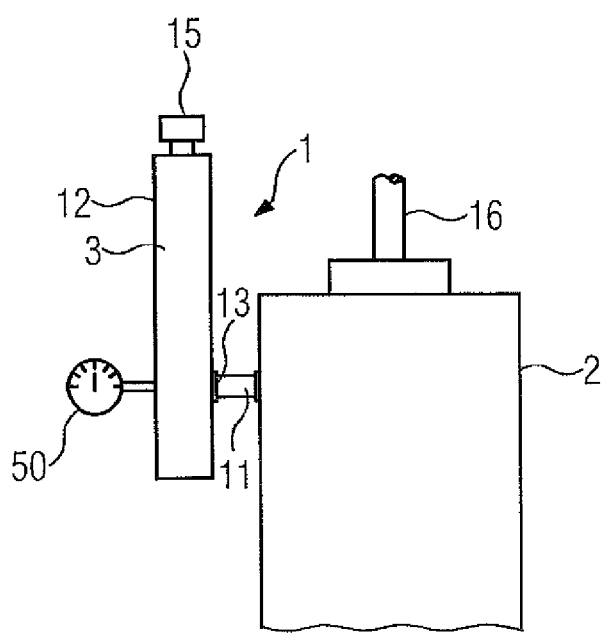
FIG. 11 is a schematic illustration of a ventilation device arranged on a transmission with a pressure measuring device.

FIG. 11 shows a side view of a ventilation device 1, which is mounted on a transmission 2. The pipeline 3 passes through a first component 11 mounted rigidly on the transmission and a second component 12 which can be rotated about a joint 13. A pressure measuring device 50 is arranged on a position of the second component 12, which lies on a the pipeline 3 facing the joint 13, with the pressure measuring device being used to measure the pressure inside the pipeline 3. The pressure measuring device 50 is used as a pressure monitor to monitor the correct function of the ventilation device 1. An impermissible overpressure inside the pipeline 3, e.g. in the event of a blockage of the ventilation opening 15, can be identified in this way.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A device for ventilating a transmission, comprising:
   a first component configured for fixed arrangement on the transmission;
   a second component configured for movable arrangement on an outer side of a transmission housing of the transmission;
   a joint configured to connect the first and second components and to permit a movement of the first and second components relative to one another;
   a pipeline extending along the first and second components and having first and second ends for an air exchange, with the first end of the pipeline arranged on the first component and with the second end of the pipeline arranged on the second component; and
   a ventilator cap arranged on the second end of the pipeline, wherein the second component has a center of gravity which is located opposite to the second end of the pipeline in relation to a connecting point between the joint and the second component.

2. The device of claim 1, wherein the pipeline extends through the first and second components and/or the joint.

3. The device of claim 1, further comprising an expansion tank connected to the second component.

4. The device of claim 1, wherein the second component has a receiving apparatus configured to accept a weight element for defining the center of gravity.

5. The device of claim 1, wherein the first component has a fastening apparatus configured to mount the first component on an outer side of the transmission housing.

6. The device of claim 1, wherein the joint is configured as a ball or rotary joint.

7. The device of claim 1, wherein the joint is configured as an axial rotary feedthrough.

8. A device for ventilating a transmission, comprising:
   a first component configured for fixed arrangement on the transmission;
   a second component configured for movable arrangement on an outer side of a transmission housing of the transmission;
   a joint configured to connect the first and second components and to permit a movement of the first and second components relative to one another;
   a pipeline extending along the first and second components and having first and second ends for an air exchange, with the first end of the pipeline arranged on the first component and with the second end of the pipeline arranged on the second component; and
   a non-return valve disposed in the pipeline to seal the pipeline against a passage of lubricant in a direction from the first component to the second component
   wherein the second component has a center of gravity which is located opposite to the second end of the pipeline in relation to a connecting point between the joint and the second component.

9. The device of claim 8, wherein the pipeline extends through the first and second components and/or the joint.

10. The device of claim 8, further comprising an expansion tank connected to the second component.

11. The device of claim 8, wherein the second component has a receiving apparatus configured to accept a weight element for defining the center of gravity.

12. The device of claim 8, wherein the first component has a fastening apparatus configured to mount the first component on an outer side of the transmission housing.

13. The device of claim 8, wherein the joint is configured as a ball or rotary joint.

14. The device of claim 8, wherein the joint is configured as an axial rotary feedthrough.

15. A transmission, comprising:
   a transmission housing having an opening; and
   a ventilation device having a first component configured for fixed arrangement on the transmission, a second component configured for movable arrangement on an outer side of the transmission housing, a joint configured to connect the first and second components and to permit a movement of the first and second components relative to one another, and a pipeline extending along the first and second components and having first and second ends, with the first end of the pipeline arranged on the first component in communication with an interior of the transmission housing via the opening, and with the second end of the pipeline arranged on the second component and connected to an environment of the transmission housing so as to enable an air exchange between the transmission interior and the environment, wherein the second component has a center of gravity which is located opposite to the second end of the pipeline in relation to a connecting point between the joint and the second component.

16. The transmission of claim 15, wherein the second end of the pipeline lies vertically above a lubricant level in the interior of the transmission housing, irrespective of a position of the transmission.

17. The transmission of claim 15, wherein the pipeline is configured to extending through the first and second components and/or the joint.

18. The transmission of claim 15, wherein the ventilation device includes an expansion tank connected to the second component.

19. The transmission of claim 15, wherein the second component has a receiving apparatus configured to accept a weight element for defining the center of gravity.

20. The transmission of claim 15, wherein the first component has a fastening apparatus configured to mount the first component on an outer side of the transmission housing.

21. The transmission of claim 15, wherein the joint is configured as a ball or rotary joint.

22. The transmission of claim 15, wherein the joint is configured as an axial rotary feedthrough.

23. The transmission of claim 15, wherein the ventilation device includes a ventilator cap arranged on the second end of the pipeline.

24. The transmission of claim 15, wherein the ventilation device includes a non-return valve disposed in the pipeline to seal the pipeline against a passage of lubricant in a direction from the first component to the second component.

* * * * *